United States Patent
Ayala et al.

[11] Patent Number: 5,988,243
[45] Date of Patent: Nov. 23, 1999

[54] PORTABLE WORK BENCH

[75] Inventors: Adan Ayala, Owings Mills; Ronald Quiram, Phoenix, both of Md.

[73] Assignee: Black & Decker Inc., Newark, Del.

[21] Appl. No.: 09/207,355

[22] Filed: Dec. 8, 1998

Related U.S. Application Data

[63] Continuation-in-part of application No. 08/899,937, Jul. 24, 1997, Pat. No. 5,875,828.
[60] Provisional application No. 60/070,501, Jan. 6, 1998, abandoned.

[51] Int. Cl.$^6$ .................................. B27B 5/24; B27C 9/00
[52] U.S. Cl. .................... 144/329; 83/859; 144/286.5; 144/287; 269/157; 269/204
[58] Field of Search ................................. 248/165, 166, 248/170, 177.1, 439, 637, 646, 647; 182/181, 184; 83/574, 859; 269/204, 157, 158, 901; 144/48.3, 286.1, 286.5, 287, 329

[56] References Cited

U.S. PATENT DOCUMENTS

| | | | |
|---|---|---|---|
| 3,222,053 | 12/1965 | Severdia | 269/197 |
| 5,526,856 | 6/1996 | Pedri | 144/287 |
| 5,592,981 | 1/1997 | Derecktor | 144/287 |
| 5,836,365 | 11/1998 | Derecktor | 144/256.5 |
| 5,875,828 | 3/1999 | Quiram et al. | 144/286.5 |

FOREIGN PATENT DOCUMENTS

| | | | |
|---|---|---|---|
| 529969 | 12/1921 | France | 269/204 |

*Primary Examiner*—W. Donald Bray
*Attorney, Agent, or Firm*—Adan Ayala

[57] ABSTRACT

An improved portable work bench includes a structural body, and a platform disposed on the structural body. In addition, the platform includes a cam mechanism for locking the position of the platform along the structural body. Further, the portable work bench may include a plurality of legs for supporting the structural body. The structural body may be tubular and preferably has a square cross-section. Accordingly, the user need only place the platform in any position along the length of the structural body and move the cam mechanism to lock the platform in place. The cam mechanism may include a cam pivotally attached to the platform near the structural body, so that when the user rotates the cam, the cam contacts the structural body, locking the platform. A plate may be disposed between the cam and the structural body. The plate may have a hook portion, which contacts the bottom surface of the structural body.

20 Claims, 2 Drawing Sheets

PORTABLE WORK BENCH

CROSS-REFERENCE TO RELATED APPLICATIONS

This is a continuation-in-part of application Ser. No. 08/899,937, filed Jul. 24, 1997, now U.S. Pat. No. 5,875,828. The present application also derives priority from U.S. application Ser. No. 60/070,501, filed Jan. 6, 1998, now abandoned.

FIELD OF THE INVENTION

This invention relates generally to work benches and more particularly to a portable work bench that can support a power tool and a workpiece.

BACKGROUND OF THE INVENTION

It is common in the construction industry for users to bring their power tools to the work site. Thus, the users require a work surface at the work site to support the power tools for use. Preferably the work surface is at a certain height so that the user can comfortably use the power tool. In addition, the work surface should also be sufficiently portable to be easily moved around a work site.

In the past, users have disposed their power tools on sheets of wood which are in turn supported by two or more sawhorses. This arrangement, however, lacks the strength for efficient operation, as well as being difficult to move around the work site.

Accordingly, different support stands or work benches have been proposed in order to provide a portable work surface that can support a power tool. Some of these prior art solutions have been described in U.S. Pat. Nos. 1,864,840, 4,860,807, 4,874,025, 4,974,651, 5,193,598, and 5,421,231. However, these prior art solutions do not provide a platform supporting the power tool which can be moved horizontally so that the power tool can be moved without moving the workpiece.

Other prior art solutions, such as the one described in U.S. Pat. No. 5,592,981, provide a platform supporting the power tool which can be moved horizontally so that the power tool can be moved without moving the workpiece. However, they require that the user insert and slide the platform from the end of the workbench towards the desired position on the workbench.

SUMMARY OF THE INVENTION

In accordance with the present invention, an improved portable work bench is employed. The portable work bench includes a structural body, and a platform disposed on the structural body. In addition, the platform includes a cam mechanism for locking the position of the platform along the structural body. Further, the portable work bench may include a plurality of legs for supporting the structural body. The structural body may be tubular and preferably has a square cross-section.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
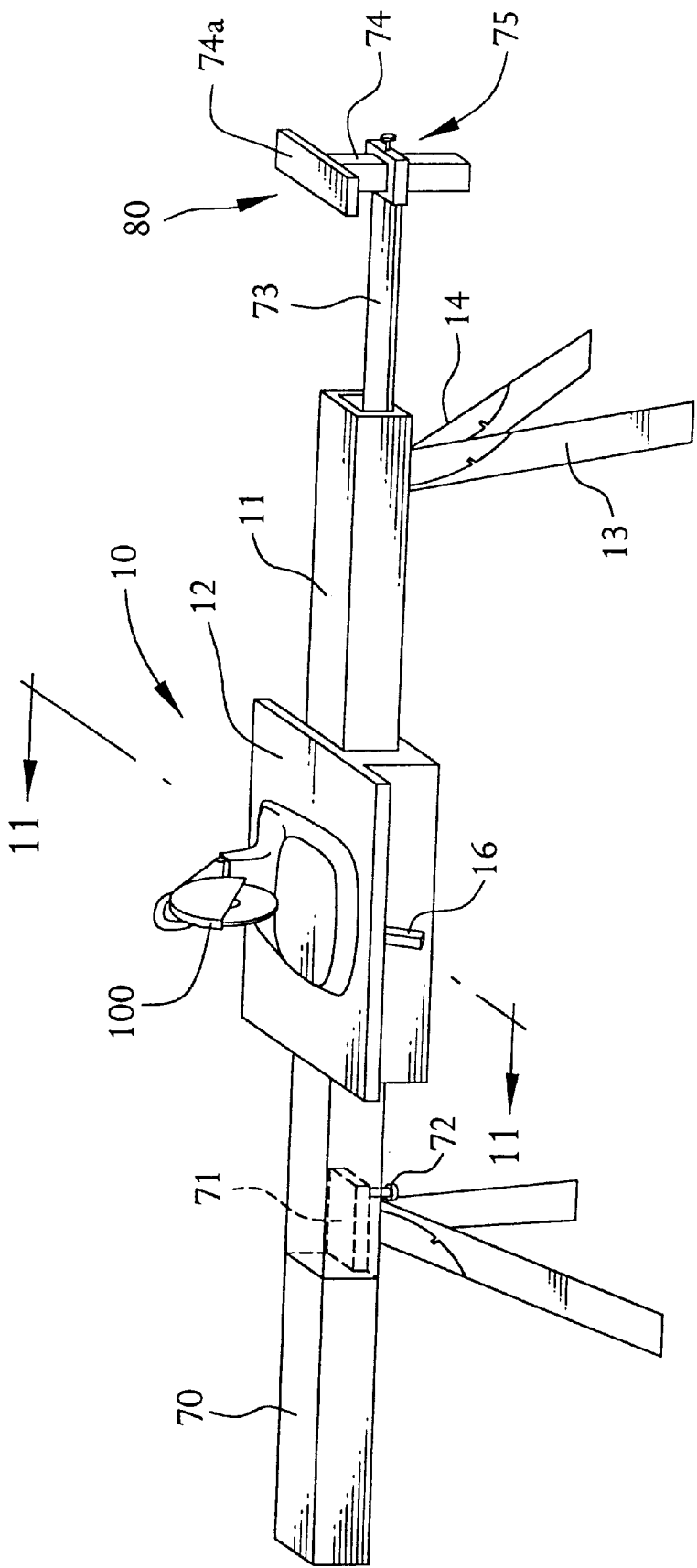
FIG. 1 is a perspective view of a portable work bench of the present invention.

The invention is now described with reference to the accompanying figures, wherein like numerals designate like parts. Referring to FIG. 1, a portable work bench 10 of the present invention is shown carrying a chop saw 100. However, persons skilled in the art will recognize that the work bench 10 can support any power tool, such as a sliding compound miter saw, a drill press, a table saw, etc., any hand tools, or anything else that needs to be supported.

The work bench 10 has a structural body 11 and a platform 12 disposed on the structural body 11. In addition, the work bench 10 may have legs 13 for supporting the structural body 11 and platform 12. The legs 13 may be connected to the body 11 via brackets 14 as is well known in the art. Persons skilled in the art are referred to U.S. Pat. Nos. 4,605,099 and 5,592,981, which disclose exemplary means for providing foldable legs for the work bench. However, persons skilled in the art will know that fixed legs which do not fold will also function properly.

Figure 2:
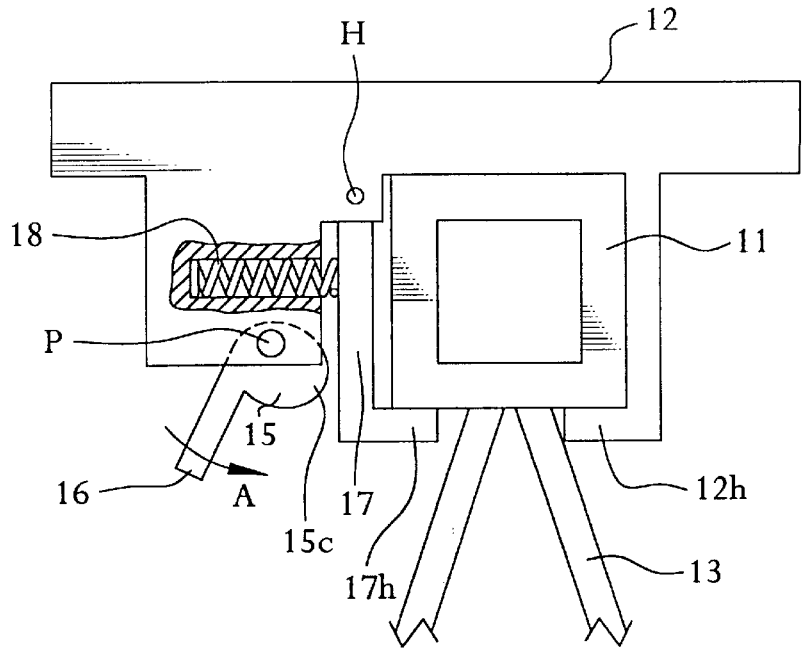
FIG. 2 is a cross-sectional side view of a first embodiment of the work bench along plane II—II—II of FIG. 1.

Referring to FIG. 2, the structural body 11 is preferably tubular so that it can withstand substantial amounts of torsional and lateral loads applied thereto. Furthermore, the cross-section of the structural body 11 is preferably square.

The platform 12 is preferably designed to receive a power tool 100 thereon in the manner well known in the art. As mentioned above, the platform 12 is disposed on the structural body 11. As seen in FIG. 2, the platform 12 may contacts the top and rear surfaces of the body 11. Platform 12 may also contact the bottom surface of the body 11 via a hook portion 12h.

Platform 12 may also have a cam 15 pivotally attached thereto and pivotable about axis P. A handle 16 is connected to cam 15 so that, upon movement of handle 16, cam 15 moves.

In addition, platform 12 may have a locking plate 17 pivotally attached thereto and pivotable about axis H. Locking plate 17 may pivot between a first position contacting the structural body 11 and a second position not contacting the structural body 11. A spring 18 may be connected between locking plate 17 and platform 12 to bias locking plate 17 towards the second position.

In order to lock platform 12 on the desired position along structural body 11, the user need only move handle 16 along direction A. This will cause cam 15 to rotate and bring cam portion 15c against locking plate 17. As cam 15 is rotated, the locking plate 17 is moved further towards the first position until it contacts structural body 11. Locking plate 17 may have a hook portion 17h to further contact the structural body 11 when in the first position. To unlock platform 12, the user need only move handle 16 in the opposite direction.

Figure 3:
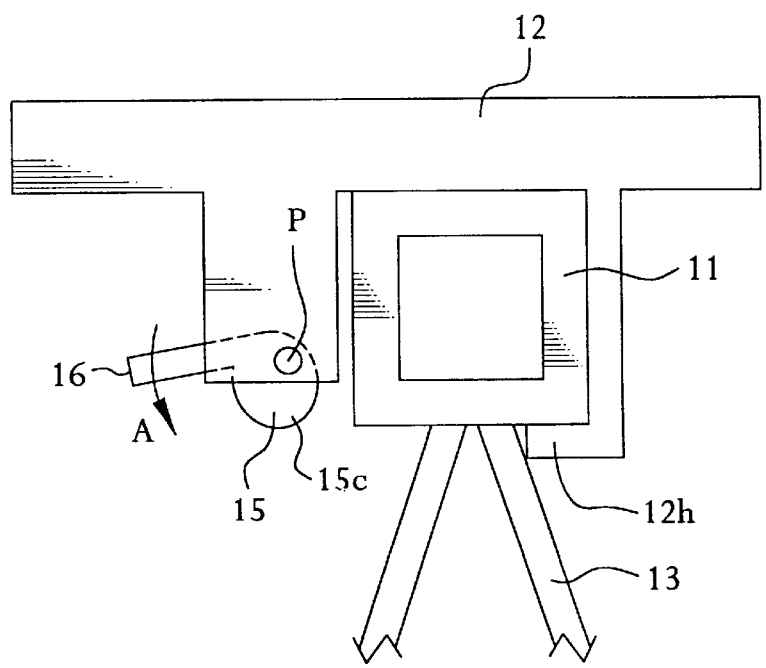
FIG. 3 is a cross-sectional side view of a second embodiment of the work bench along plane II—II—II of FIG. 1.

Persons skilled in the art will recognize that the same result, i.e., locking platform 12 on a desired position along structural body 11, may be achieved without locking plate 17 and spring 18, as shown in FIG. 3. Instead, cam 15 will contact structural body directly.

In addition, persons skilled in the art will recognize that extensions can be added to the portable work bench as is well known in the art. Referring to FIG. 1, extension 70 can be inserted into the structural body 11 in order to increase its length, allowing the user to move the platform 12 along a greater length. Preferably, extension 70 has the same cross-section as the structural body 11. Extension 70 preferably has a fixed inner joint 71, which can be inserted into the structural body 11. The joint 71 can then be secured by means of a screw or pin assembly 72.

A workpiece support mechanism 80 can also be used on the work bench. This mechanism can support an elongated workpiece, such as moldings, etc., so that the user can cut it accurately.

The support mechanism 80 has a bar 73, which is slidably attached to the structural body 11. A clamp assembly 75 is disposed at the end of bar 73. The clamp assembly 75 slidably receives and clamps a bar 74. A support end 74*a* is in turn disposed at the end of bar 74. Accordingly, a user can adjust the bar 74 and support end 74*a*, and then adjust the bar 73 so that the workpiece is properly supported.

Persons skilled in the art may recognize other additions or alternatives to the means disclosed herein. However, all these additions and/or alterations are considered to be equivalents of the present invention.

What is claimed is:

1. A portable work bench comprising:

a structural body;

a platform disposed on the structural body; and a locking mechanism disposed on one of the structural body and the platform, said locking mechanism comprising a cam movable between a first position locking the platform on the structural body and a second position unlocking the platform.

2. The work bench of claim 1, further comprising a plurality of legs supporting the structural body.

3. The work bench of claim 1, wherein the structural body is tubular.

4. The work bench of claim 1, wherein the structural body has a square cross-section.

5. The work bench of claim 1, wherein the platform further comprises a top surface, upon which a power tool can be installed thereon.

6. The work bench of claim 1, wherein the platform is movable along the structural body.

7. The work bench of claim 1, wherein the cam is pivotable about an axis.

8. The work bench of claim 7, wherein the axis is substantially parallel to longitudinal axis of the structural body.

9. The work bench of claim 1, wherein the platform comprises a hook portion contacting the structural body.

10. The work bench of claim 1, wherein the locking mechanism further comprises a plate disposed between the cam and the other of the structural body and the platform.

11. The work bench of claim 10, wherein the locking mechanism further comprises a spring for biasing the plate towards the cam.

12. The work bench of claim 1, further comprising a handle connected to the cam for moving the cam between first and second positions.

13. The work bench of claim 1, further comprising an extension that can be installed at an end of said structural body.

14. The work bench of claim 1, further comprising a support mechanism installed at an end of said structural body for supporting an elongated work piece.

15. A method for using a work bench, comprising:

providing a structural body, disposing a platform on the structural body, disposing a locking mechanism on one of the structural body and the platform, said locking mechanism comprising a cam movable between a first position locking the platform on the structural body and a second position unlocking the platform, and moving the cam between the first and second positions.

16. The method of claim 15, further comprising installing a power tool on the platform.

17. The method of claim 15, further comprising moving the platform along the structural body.

18. The method of claim 15, wherein the locking mechanism further comprises a plate disposed between the cam and the other of the structural body and the platform.

19. The method of claim 18, wherein the locking mechanism further comprises a spring for biasing the plate towards the cam.

20. The method of claim 15, further comprising providing a handle connected to the cam for moving the cam between first and second positions.

* * * * *